United States Patent [19]

Obrowski

[11] 4,139,761

[45] Feb. 13, 1979

[54] HOUSEHOLD COFFEE MACHINE WITH CALCIFICATION INDICATOR

[75] Inventor: Frank Obrowski, Bad Duerrheim, Fed. Rep. of Germany

[73] Assignee: Wigo Gottlob Widmann & Söehne GmbH & Co., KG, Villingen-Schwenningen, Fed. Rep. of Germany

[21] Appl. No.: 784,437

[22] Filed: Apr. 4, 1977

[30] Foreign Application Priority Data

Apr. 10, 1976 [DE] Fed. Rep. of Germany ....... 2615824

[51] Int. Cl.² ............... H05B 1/02; A47J 31/56; F24H 1/10; A47J 31/58
[52] U.S. Cl. .................. 219/308; 99/281; 99/285; 99/288; 99/307; 219/283; 219/297; 219/330; 219/506; 222/146 HE
[58] Field of Search ............ 219/283, 296–299, 219/300, 301–309, 322, 327, 328, 330, 331, 506; 99/280, 281, 282, 283, 285, 288, 304–307, 313; 222/146 R, 146 HC

[56] References Cited

U.S. PATENT DOCUMENTS

| 3,711,681 | 1/1973 | Leuschmer et al. ............ 219/328 |
| 4,039,772 | 8/1977 | Thorsoe et al. ................ 219/328 |

FOREIGN PATENT DOCUMENTS

| 2234661 | 1/1974 | Fed. Rep. of Germany ........... 99/304 |
| 2256229 | 5/1974 | Fed. Rep. of Germany ........... 99/280 |
| 2264588 | 6/1974 | Fed. Rep. of Germany .......... 219/302 |
| 2505789 | 8/1976 | Fed. Rep. of Germany .......... 219/308 |
| 1439154 | 6/1976 | United Kingdom ................. 99/285 |

*Primary Examiner*—A. Bartis
*Attorney, Agent, or Firm*—Kenway & Jenney

[57] ABSTRACT

A household coffee machine of the type including a thermostatically controlled electric flow heater coupled to cold water supply and having a hot water outflow is provided with a calcification indicator connected electrically in parallel with the heater thermostat. The calcification indicator includes an indicator, such as a buzzer or glow lamp, in series with a thermal cut-out switch which is disposed in thermally responsive association with the line coupling the cold water supply to the flow heater. The series connected thermal cut-out switch and indicator have a high impedance in order to insure that the calcification indicator does not respond when the heater thermostat is closed.

4 Claims, 2 Drawing Figures

HOUSEHOLD COFFEE MACHINE WITH CALCIFICATION INDICATOR

GENERAL BACKGROUND, OBJECTS AND SUMMARY OF INVENTION

The invention relates to a household coffee machine of the type which includes a flow heater, a cold water supply, and a hot water outflow, a thermostat for controlling the temperature of the flow heater, and a heat detector-equipped switch operable to actuate a calcification indicator device.

There does exist a household coffee machine, of the type described above, in which the switch for actuating the calcification indicator is a heat actuated switch whose heat detector is arranged at the hot water outflow of the flow heater. In this device, the switch is series connected with the calcification indicator device, the latter giving a signal before the calcine deposits in the water flow path of the heater reach an inadmissible extent and impair the performance of the appliance.

This prior appliance also contains a thermostat that interrupts the heater filament circuit of the flow heater as soon as the heater exceeds a given temperature.

This known device has a drawback inasmuch as the heat detector of the switch controlling the calcification indicator device is mounted in the hot portion of the line issuing from the flow heater. With this arrangement, after termination of the water flow through a new appliance, or a not calcified appliance, or a calcified appliance, steam is generated in and flows through the water line. This steam causes a temperature rise which is detected by the heat detector. In response to this temperature rise, the heat detector opens the heater filament circuit and actuates the calcification indicator.

Further, in this known appliance, the flow heater works subsequent to the water heating process as a hot plate or pot warming element. Thus, there exists the risk that the calcification indicator device will respond also during the heat holding period (i.e., the period while the coffee pot heat is being maintained) since the holding temperature of such a flow heater lies substantially above operating temperature during the water heating process.

For the reasons noted above, no clear calcification indication is assured in the device described.

There is also a coffee machine known that consists of a cold water container, a check valve, an electric flow heater, a feedpipe and a filtering device. This other machine also includes a calcification indicator device whereby a differential pressure gage arranged between the check valve and the outlet of the flow heater is disposed in working connection with the calcification indicator device. In this case the indicator device may be an optical and/or acoustical signaler. Since even a transient or short-term pressure rise in the flow heater is indicated by means of the differential pressure gage, no clear indication of the state of calcification is thereby assured. Moreover, since a pressure rise may appear during operation of the flow heater when it is not calcified, the indicating device can be actuated when there is no calcification at all.

The present invention is intended to create a household coffee machine having a calcification indicating device that assures a reliable indication of the state of calcification. The invention accomplishes this in that the calcification indication device (including series-connected switch) is connected in parallel with the heating thermostat and that the heat detector for the calcification indicator is arranged at the cold water supply.

According to the invention, the switch condition of the heating thermostat during the water heating process, that is, during the making of the coffee, is used for the indication of calcification. That is to say, the calcification indication device is actuated when the flow heater attains, during the water heating process, such a temperature that the heating thermostat becomes actuated to a "cut-out" condition. Through the switch of the calcification indicator being actuated to an "open" condition in response to the conclusion of the coffee making period, the calcification indication device is switched off after termination of the water heating process so that heating of the flow heater after the water heating process can no longer affect the calcification indicator.

In comparison to the resistance of the heating thermostat, the calcification indication circuit (i.e. indicator and switch) is preferably designed for relatively high-impedance in order to insure that the calcification indication device does not respond when the heating thermostat switch is closed.

Upon excessive calcification of the appliance occurring, i.e. with a certan degree of lime precipitation occurring in the flow heater, the heating thermostat switch is actuated to an open condition because of the resulting temperature rise in the flow heater. The calcification indicator switch remains closed until the coffee making is concluded. The heat detector of the calcification indicator switch is affected by the temperature of the cold water in such a way that the switch remains closed until the water heating process is concluded.

DRAWINGS

The invention is explained hereunder with the aid of the appended drawings, depicting exemplified embodiments.

As shown in the drawings:

FIG. 1 provides a diagrammatic representation of a household coffee machine in accordance with the invention; and FIG. 2 schematically illustrates the electric wiring diagram of the coffee machine of FIG. 1.

DETAILED DESCRIPTION OF THE INVENTION

Figure 1:
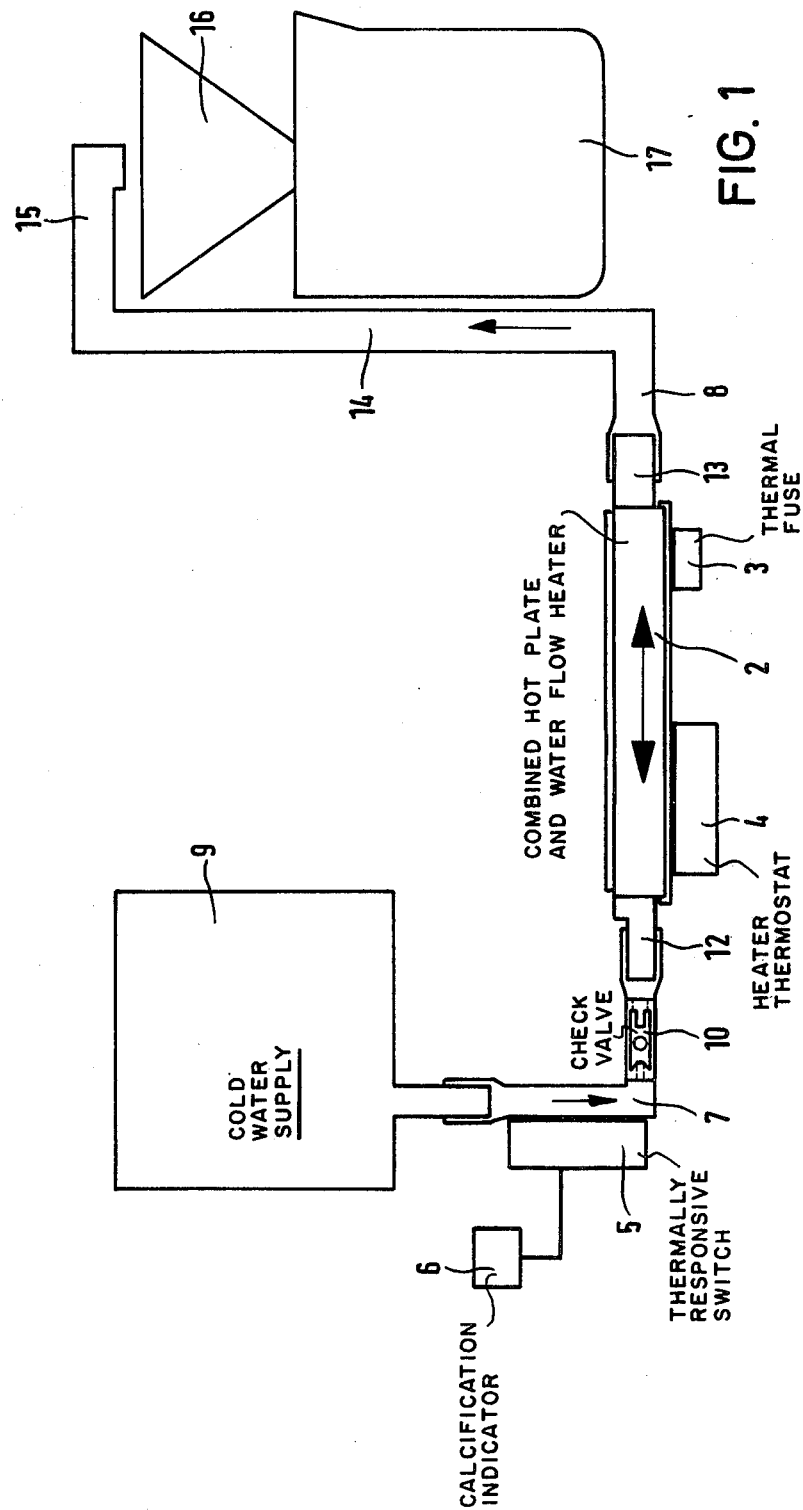
Figure 2:
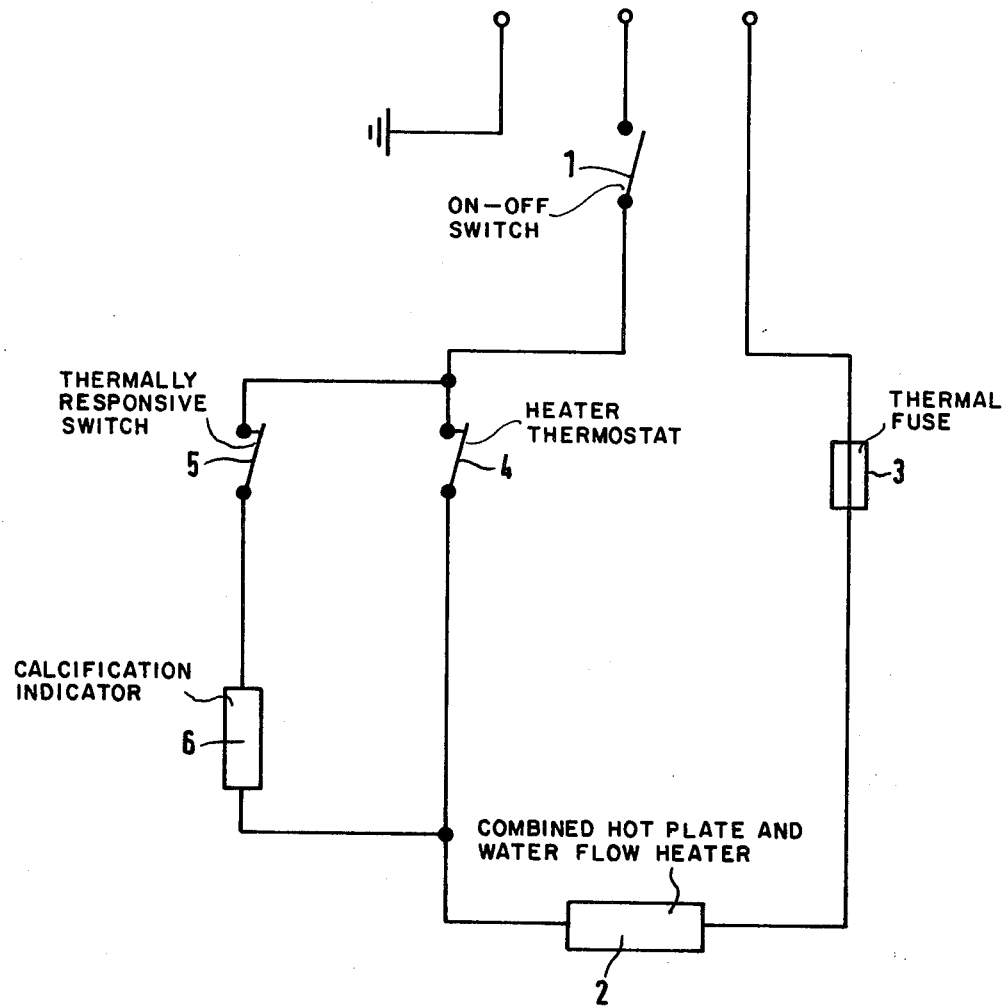

FIGS. 1 and 2 depict the structure and circuitry, respectively, of the present invention.

The houshold coffee machine of this invention includes a flow heater 2, a cold water supply conduit 7, and a hot water outflow 8. A thermostat 4 controls the temperature of the flow heater 2. A heat responsive switch 5 controls operability of a calcification indicator 6.

The calcification indicator device 6 is series connected with its thermally responsive switch 5. Device 6 and switch 5 are connected in parallel with the thermostat 4. Further, the heat detector means of the switch 5 is mounted at the cold water supply line 7 so as to be thermally responsive to cold water line temperatures.

The aforesaid household coffee machine is further characterized in that the calcification indicator circuit (i.e. the circuit including 5,6) is designed with relatively high-impedance, as compared to the resistance of the thermostat 4.

In the household coffee machine as above noted, the thermostat 4 and the heat detector of the switch 5 are so adjusted that, where excessive calcification of the flow heater 2 exists, the thermostat 4 will be opened because of the temperature rise in the flow heater 2, while the heat responsive switch 5 remains closed because of the temperature of the cold water in the cold water supply line 7.

The cut-in or switch opening temperature, at which (and below which) the switch 5 keeps the calcification indicator device in operable state, lies below the switch opening temperature of thermostat 4.

Thus, the cut-out temperature and the opening temperature of the thermostat 4 and of the thermally responsive switch 5 respectively are so coordinated that when flow heater 2 is not excessively calcined and overheated, the switch 5 is opened after conclusion of the water heating process and before the switch of the thermostat 4 opens, each opening occurring in response to the presence of steam in line 7 as hereinafter described.

Thus, the thermostat 4 may be characterized by a "cut-out" or switch opening temperature that is at least 40° C. higher than the desired operating temperature of unit 2, while switch 5 may be characterized by a switch opening temperature that is only about 30° C. higher than the desired fresh water temperature.

As shown in FIG. 2, a manually operable turn-on/turn-off switch 1 is included in the preferably grounded circuit.

FIG. 1 depicts a household coffee machine which is provided with a plate-shaped flow heater 2. Flow heater 2 has an internal water flow passage which serves to heat water. Heater 2 also acts as a hot plate for heating the coffee jug 17 which, after coffee making is concluded, is set down on the top of the plate-shaped flow heater.

The "holding" or pot heating temperature of the flow heater 2 is kept constant with switching thermostat 4. A thermal fuse 3, is series connected with the thermostat (heat level responsive switch) 4 and the filament winding of the flow heater 2. This fuse is temperature responsive and protects the appliance in case the thermostat fails.

The switch opening temperature of the thermostat 4 is so selected that during the water heating process, there occurs no opening of the circuit in unit 4, unless excessive calcification should be present on the interior, flow passage, walls of flow heater 2.

When making coffee, water flows from a fresh water container 9 through the cold water line 7, via a check valve 10, to the cold water inlet 12 of the flow heater 2. In the flow heater 2, the water is heated and flows through a flow heater outlet 13 to the hot water line 8, through the standpipe 14, through the water overflow 15, through the coffee-filled filter 16 and into the coffee jug 17.

After prolonged use and depending on the lime content of the applied water, the water passage of the flow heater 2 becomes calcified, especially in the region of the hot water outlet 13 and the portion of line 8 near this outlet.

Upon the beginning of calcification, there occurs a substantial decrease in heat conductance in unit 2 so that unit 2 overheats and the thermostat 4 opens its switch during the water heating process. The supply of current to the heating filament of the flow heater is now supplied through elements 5 and 6 until the completion of water heating.

Because of the good heat-conducting connection of the thermal actuator sensor of switch 5 with the cold water line 7, the switch contact of the heat detector 5 (switch 5 being of a thermostat type) remains closed during water heating so that the current now flows through the heat detector 5 and the calcification indicator device 6.

The calcification indicator device can be a buzzer, a filament lamp or a glow lamp or the like.

The calcification indicator device is thus actuated by opening of thermostat 4 and indicates to the user during the water heating process that a decalcification of the appliance is required.

The opening temperature of the switch 5 which is equipped with a heat detector lies about 30° C. above the fresh water temperature so that the contact of switch 5 remains closed during the water heating, i.e. coffee process.

As soon as the coffee making is concluded, the water boils off in the flow heater 2 and steam is generated which simultaneously escapes through the cold water inlet 12 and the hot water outlet 13. The steam causes a temperature rise in the line 7 and thus at the heat detector location of switch 5. This temperature rise opens the contact of switch 5 and thus shuts off heater 2.

Thereafter, with the coffee filled jug 17 resting on plate 2, heating control is maintained by thermostat 4. The "hot plate" temperature of unit 2, with no water in line 7, will cause switch 5 to remain open, with pot heating being regulated by thermostat 4.

Having described the "calcified" mode of operation of the invention, reference will now be made to the "uncalcified" mode of operation.

As noted, the opening temperature of the switch 5 which is equipped with a heat detector which opens switch 5 at about 30° C. above the fresh water temperature in line 7 so that the contact of switch 5 remains closed during the coffee making process.

To ensure that the indication device 6 is not also actuated in the "uncalcified" mode during and immediately after termination of the water flow, the switch 5, controlling operation of the calcification indication device, is connected in heat-conductance (i.e. cooling relation) with the cold water line 7.

During uncalcified operations, the switch in unit 4 remains closed and the high impedance of circuit 5–6 prevents operation of indicator 6.

As soon as coffee making is concluded, the water boils off in the flow heater 2 and steam is generated which simultaneously escapes through the cold water inlet 12 and the hot water outlet 13. The steam causes a temperature rise in the line 7 and thus at the heat detector of switch 5. This temperature rise opens the contacts of switch 5 before the thermostat 4 interrupts the filament circuit.

Thus, the calcification indicator device is unable to operate at this point in time. This state is also maintained when the coffee jug 17, resting on the flow heater plate 2, is subsequently kept hot because the closing temperature of the heat-detector-equipped switch 5 lies below the ambient temperature arising during the pot holding and heat maintenance period and the cooling effect of line 7 is absent. This ambient temperature is kept approximately constant by the periodically occurring reheating of the flow heater 2 through operation of thermostat 4.

To insure that the calcification indicator device 6 does not respond during coffee making when the appliance is not calcified, that is when the contact of the thermostat 4 as well as the heat-detector-equipped switch 5 are closed, the parallel circuit to thermostat 4 is of high-impedance character. This can be accomplished, for example, through the use of a calcification indicator device of high-impedance.

As will be appreciated, while individual components of the coffee maker described above may be obtained in the form of well known electrical or structural componants, the arrangement described is unique.

SUMMARY OF MAJOR ADVANTAGES AND SCOPE OF INVENTION

The major advantages of the invention resides in the attainment of a calcification indicator which will not provide a false calcification indication during the water flow cycle, during the steam generating cycle at the end of water flow, or during the pot warming or "holding" cycle.

However, a reliable calcification indication will be provided during the coffee making process when excessive heating of unit 2 occurs (i.e. when calcification prevents water flow from maintaining normal water heating temperatures of unit 2 through cooling action).

The invention is not limited to the represented exemplified embodiments, but can be modified within the framework of the patent claims.

Thus, those skilled in this art and familiar with the present disclosure will recognize additions, deletions, substitutions, equivelant arrangements, and other modifications falling within the scope of the invention as set forth in the appended claims.

What is claimed is:

1. In a household coffee machine including
   an electrically energized flow heater,
   a cold water supply conduit,
   a hot water outlet,
   a thermostat in heat exchange relationship with said flow heater and operable to control the temperature of the flow heater,
   a calcification indicator, and
   a thermally responsive switch operable to determine the operating condition of said calcification indicator;
   the improvement comprising:
   said thermally responsive switch being disposed in heat exchange relationship with said cold water supply conduit,
   said calcification indicator and said thermally responsive switch being mutually series connected and comprising a circuit portion connected in parallel with said thermostat,
   said thermally responsive switch and said thermostat being normally closed,
   said circuit portion including said calcification indicator and said responsive switch being designed with such a high impedance relative to the impedance of the thermostat that the calcification indicator cannot operate if the thermostat is closed,
   the opening temperatures of said thermostat and said thermally responsive switch being such that, with a calcified state of the flow heater existing,
   said thermostat will be opened because of an abnormally high temperature rise in the flow heater, and
   said thermally responsive switch will remain closed because of the relatively cold temperature of the cold water in said cold water supply conduit to energize said calcification indicator and to maintain the flow heater energized, and
   the opening temperatures of said thermostat and said thermally responsive switch are such that, during an uncalcified condition of the flow heater, said thermally responsive switch is opened after the conclusion of water heating by the flow heater and before the opening of the thermostat in response to the presence of steam in the cold water supply conduit.

2. A household coffee machine as described in claim 1 wherein:
   said flow heater is designed to serve as a hot plate for warming a coffee pot, and
   the switch opening temperature of said thermally responsive switch is less than the temperature of said flow heater as maintained by said thermostat while said coffee pot is being warmed on said flow heater.

3. A household coffee machine as described in claim 1 wherein:
   the switch opening temperature of said thermostat is at least 40° C. higher than a desired operating temperature of said flow heater while said flow heater is uncalcified and water flowing therethrough is being heated.

4. A household coffee machine as described in claim 1 wherein:
   said flow heater is designed to serve as a hot plate for warming a coffee pot,
   the switch opening temperature of said thermally responsive switch is less than the temperature of said flow heater as maintained by said thermostat while said coffee pot is being warmed on said flow heater, and
   the switch opening temperature of said thermostat is at least 40° C. higher than a desired operating temperature of said flow heater while said flow heater is uncalcified and water flowing therethrough is being heated.

* * * * *